No. 718,330. PATENTED JAN. 13, 1903.
J. T. EDWARDS.
ARTIFICIAL HORIZON.
APPLICATION FILED SEPT. 20, 1902.
NO MODEL.
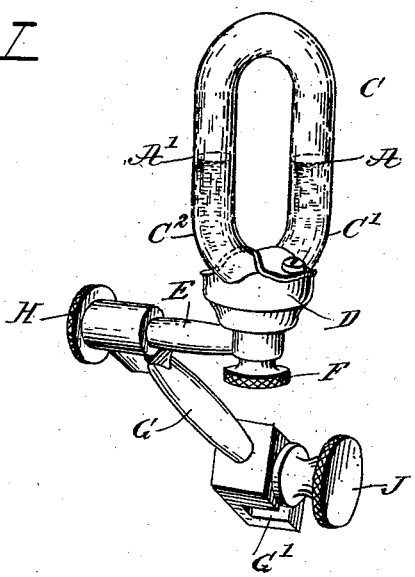
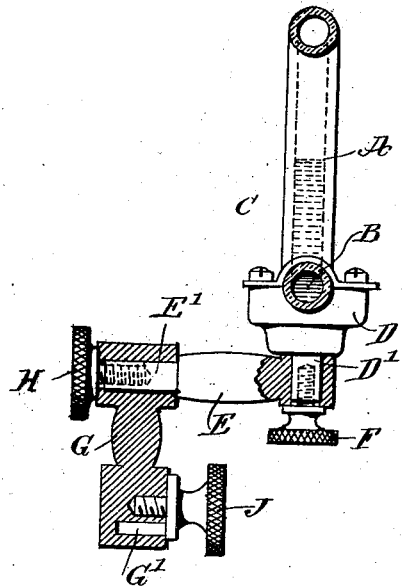
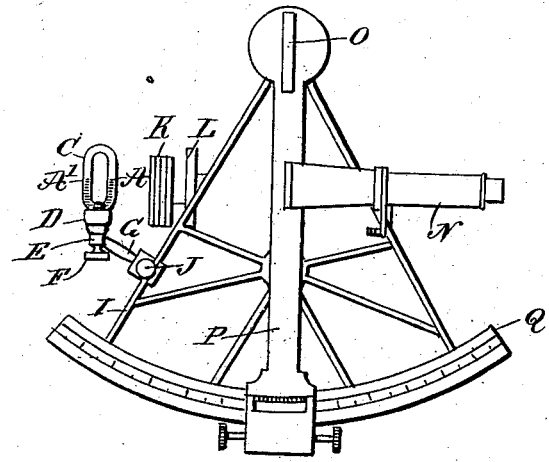
WITNESSES:
H. Walker
Theo. J. Hooster
INVENTOR
Joseph Thomas Edwards
BY
ATTORNEYS.

ly empty.

UNITED STATES PATENT OFFICE.

JOSEPH THOMAS EDWARDS, OF NEW BEDFORD, MASSACHUSETTS.

ARTIFICIAL HORIZON.

SPECIFICATION forming part of Letters Patent No. 718,330, dated January 13, 1903.

Application filed September 20, 1902. Serial No. 124,198. (No model.)

*To all whom it may concern:*

Be it known that I, JOSEPH THOMAS EDWARDS, a citizen of the United States, and a resident of New Bedford, in the county of Bristol and State of Massachusetts, have invented a new and Improved Artificial Horizon, of which the following is a full, clear, and exact description.

The invention relates to astronomical and surveying instruments; and its object is to provide a new and improved artificial horizon more especially designed for use on marine sextants which is simple in construction, easily attached to the frame of a sextant, and arranged to enable the marine observer to quickly and accurately bring the eyepiece and horizon-glass in proper horizontal position while sighting through the eyepiece.

The invention consists of novel features and parts and combinations of the same, as will be more fully described hereinafter and then pointed out in the claims.

A practical embodiment of the invention is represented in the accompanying drawings, forming a part of this specification, in which similar characters of reference indicate corresponding parts in all the views.

Figure 1 is a perspective view of the improvement. Fig. 2 is a transverse section of the same, and Fig. 3 is a side elevation of a sextant provided with the improvement.

The artificial horizon consists, essentially, of two connected liquid-levels A and A', spaced apart and formed by a liquid B, (mercury, water, or the like,) contained in a pipe C, bent to U shape to produce upright legs C' and C², connected with each other at the bottom (and preferably also at the top) for the levels A and A' to rise and fall in the legs, according to the position in which the sextant is held by the observer, as hereinafter more fully described.

The bottom or connecting portion of the pipe C, which is preferably made of glass, is secured in a head D, provided with a depending pivot D', mounted to turn in the outer end of a transverse arm E and adapted to be fastened therein by a clamping-screw F, as plainly indicated in Fig. 2.

The arm E is provided with a horizontal pivot E', mounted to turn in an arm G and adapted to be secured thereto by a clamping-screw H, and the arm G is provided with a slot G', fitting on one of the side members of the frame I of the sextant, as plainly shown in Fig. 3, a clamping-screw J being employed for securing the arm G in position on the side member of the sextant-frame.

By the arrangement described the pipe C, containing the liquid, and the levels A and A' are arranged in front of shades K, extending over a horizon-glass L, opposite which is located an eyepiece N.

Now by having the head D, carrying the pipe C, containing the liquid B, adjustable in the arm E and the latter adjustable in the arm G it is evident that the levels A and A' can be brought in axial alinement with the horizon-glass L and eyepiece N at the time the sextant is held in its usual normal position, as indicated in Fig. 3. When the observer uses the sextant and sights through the eyepiece N, then he can easily determine whether the sextant-frame I is held in the proper position or not, as the levels A and A' must coincide with the axial vision. Now when the sextant is not held in proper position it is evident that the liquid B rises in one of the legs of the pipe C and falls in the other, and consequently the levels A and A' are not in axial alinement with the horizon-glass L and eyepiece N, and hence the sextant is not in proper position. Now by the operator manipulating the sextant he can readily cause the liquid to move in the pipe C until the levels A and A' coincide with the axes of the horizon-glass L and eyepiece N.

It is understood that the sextant is provided with the usual index-glass O, held on a movable radius P, indicating on a graduated arc Q, as indicated in Fig. 3.

I prefer to make the pipe C in link or endless shape, as indicated in Fig. 1, to prevent loss or spilling of the liquid B in the pipe.

Having thus described my invention, I claim as new and desire to secure by Letters Patent—

1. An artificial horizon, comprising spaced connected liquid-levels mounted in a movable head portion, and an adjustable arm supporting said head portion, a second arm carrying the head-supporting arm, substantially as set forth.

2. An artificial horizon, comprising a liquid-level mounted on a movable head portion, an arm supporting said head portion, a second arm adjustably carrying the head-supporting arm, and means on the last-mentioned arm for securing the device to a sextant, substantially as set forth.

3. An artificial horizon, comprising a liquid-level mounted in a movable head portion, an adjustable arm for supporting said head portion, a slotted bracket for said arm, and a set-screw coöperating with the slotted portion of said bracket for securing the device to a sextant, as set forth.

4. An artificial horizon, comprising a U-shaped tube for containing a liquid, and an adjustable support for said tube adapted to be fastened to a sextant, and means for adjusting the tube relative to the adjustable support, as set forth.

5. An artificial horizon, comprising a U-shaped tube for containing a liquid, a head in which the middle portion of the tube is secured, an arm in which the head is adjustably mounted, a second arm in which the first said arm is adjustably mounted, and a slotted bracket having a set-screw for attaching the second arm to the frame of a sextant, as set forth.

6. An artificial horizon comprising spaced connected liquid-levels, means for adjustably securing the device to a sextant, and means for adjusting the level to bring the same into alinement with the horizon-glass and eyepiece of a sextant, substantially as set forth.

7. An artificial horizon comprising a liquid-level, a support therefor, and means for adjusting the level on its horizontal axis relative to said support.

In testimony whereof I have signed my name to this specification in the presence of two subscribing witnesses.

JOSEPH THOMAS EDWARDS.

Witnesses:
  ISAIAH C. DADE,
  FREDERICK S. FULLER.